(12) United States Patent
Kitayama et al.

(10) Patent No.: US 8,550,537 B2
(45) Date of Patent: Oct. 8, 2013

(54) AUTOMOTIVE VEHICLE PASSAGE SEAL

(75) Inventors: Kenichi Kitayama, Tochigi (JP);
Masatoshi Mori, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 12/940,448

(22) Filed: Nov. 5, 2010

(65) Prior Publication Data

US 2012/0112494 A1    May 10, 2012

(51) Int. Cl.
*E06B 7/22* (2006.01)
*B60J 10/08* (2006.01)

(52) U.S. Cl.
USPC .................. 296/146.9; 49/498.1; 277/921

(58) Field of Classification Search
USPC ............ 49/475.1, 476.1, 483.1, 484.1, 495.1, 49/496.1, 498.1; 277/640, 641, 642, 921; 296/146.9
See application file for complete search history.

(56) References Cited

U.S. PATENT DOCUMENTS

| | | | |
|---|---|---|---|
| 2,379,193 A * | 6/1945 | Shields | 49/496.1 |
| 2,700,194 A * | 1/1955 | Rasmussen | 49/496.1 |
| 2,751,638 A * | 6/1956 | Wallenbrock | 49/490.1 |
| 4,445,721 A * | 5/1984 | Yaotani et al. | 296/154 |
| 4,538,380 A * | 9/1985 | Colliander | 49/475.1 |
| 4,934,101 A * | 6/1990 | Hannya et al. | 49/502 |
| 5,127,702 A | 7/1992 | Akachi et al. | |
| 5,390,974 A * | 2/1995 | Theodorakakos | 296/146.9 |
| 6,397,525 B1 | 6/2002 | Ishibashi et al. | |
| 6,464,286 B2 * | 10/2002 | Heuel | 296/146.9 |
| 6,487,820 B1 | 12/2002 | Nakajima et al. | |
| 6,623,832 B2 * | 9/2003 | Greven | 428/121 |
| 6,846,034 B1 * | 1/2005 | Angus et al. | 296/146.9 |
| 6,874,281 B2 * | 4/2005 | Fujita et al. | 49/490.1 |
| 7,293,820 B2 * | 11/2007 | Hashimoto et al. | 296/146.9 |
| 7,543,881 B2 * | 6/2009 | Okajima et al. | 296/146.9 |
| 7,578,098 B2 | 8/2009 | Furuzawa et al. | |
| 2007/0245634 A1 | 10/2007 | Oba et al. | |
| 2008/0122250 A1 * | 5/2008 | Lichter et al. | 296/146.9 |
| 2008/0178531 A1 * | 7/2008 | Takeuchi et al. | 49/475.1 |
| 2008/0246304 A1 * | 10/2008 | Huttebraucker et al. | 296/146.9 |
| 2009/0295194 A1 | 12/2009 | Takeuchi et al. | |
| 2012/0223542 A1 * | 9/2012 | Nishimoto et al. | 296/146.9 |
| 2012/0267914 A1 * | 10/2012 | Thiele et al. | 296/146.9 |

FOREIGN PATENT DOCUMENTS

| | | | |
|---|---|---|---|
| DE | 3411559 A1 * | 10/1985 | |
| EP | 604007 A1 * | 6/1994 | |
| JP | 57110524 A * | 7/1982 | |
| JP | 58056913 A * | 4/1983 | |
| JP | 01109144 A * | 4/1989 | |
| JP | 03284416 A * | 12/1991 | |
| JP | 04110228 A * | 4/1992 | |
| JP | 04297348 A * | 10/1992 | |
| JP | 06106993 A * | 4/1994 | |

(Continued)

*Primary Examiner* — Glenn Dayoan
*Assistant Examiner* — Paul Chenevert
(74) *Attorney, Agent, or Firm* — Fay Sharpe LLP

(57) ABSTRACT

An automotive vehicle comprising a body panel including a flange defining an opening. The opening is shaped to receive a component selected from a door, a trunk or a tailgate. The component includes a main body panel and an interior lining having a substantially coplanar region facing the flange when the component is in a closed position. An elongated resilient sealing member is secured to the coplanar region of the component. The sealing member includes a base engaging the interior lining and a tubular body projecting from said base opposite the lining. An arm extends from an edge of the base and overlaps the interior lining.

20 Claims, 2 Drawing Sheets

(56) References Cited

FOREIGN PATENT DOCUMENTS

| | | | |
|---|---|---|---|
| JP | 06179324 A | * | 6/1994 |
| JP | 11011150 A | * | 1/1999 |
| JP | 11011150 A2 | | 1/1999 |
| JP | 2000033638 A | * | 2/2000 |
| JP | 2000033638 A2 | | 2/2000 |
| JP | 2007210385 | | 8/2007 |
| JP | 2007210385 A | * | 8/2007 |
| JP | 2009107397 A | * | 5/2009 |
| JP | 2009107397 A2 | | 5/2009 |

* cited by examiner

AUTOMOTIVE VEHICLE PASSAGE SEAL

BACKGROUND

The present disclosure relates to seals used in automotive vehicles. It finds particular utility as a weather strip for doors. However, it is to be appreciated that the present exemplary embodiment is also amenable to other like applications.

Vehicles have many openings such as doors, trunks, tailgates and hatchbacks. In this regard, weather strips are used for sealing automobile compartments to prevent rain, dirt, mud, noise, external temperatures and the like from entering the compartment. Weather strips seal a space defined between the door, trunk, tailgate and the body panels located adjacent to the doors.

The sealing elements must have good durability, such that the opening can be opened and closed repeatedly, without losing the sealing ability thereof. The elements used in sealing the openings must also be securely attached to the vehicle body, to prevent them from separating therefrom, with resulting poor performance. A number of different seal and weather strip devices are known for sealing the interior of vehicles from the exterior, providing impact resistance and enhancing the appearance of the opening.

An example of a weather strip providing a seal between a door and the body portion of a vehicle can be found in U.S. Pat. No. 7,578,098 and is shown in FIG. 1. As shown, a door weather strip 2 is attached along an outer periphery of a door frame 4 of a vehicle door 6 to provide a seal between the vehicle door frame 4 and a door opening portion 8. The door weather strip 2 includes a base portion 10, a main seal 12 and a sub-seal 14. The main seal 12 is formed on an inside part of the base portion 10 integrally therewith for contacting the door opening portion 8, and the sub-seal 14 is formed on an outside part of the base portion 10 integrally therewith to seal a gap between an outer periphery of the door frame 4 and a facing door opening portion 8.

The base portion 10 has a generally triangular cross-section of which the thickness gradually increases outwardly, and a space 16 is provided in a widthwise center thereof for reducing the weight of the door weather strip 2 and improving the flexibility of the base portion 10. Ribs 18 and 20 are formed integrally with the base portion 10 so as to project in a widthwise direction thereof for fitting the base portion 10 in a retainer 22 secured to the outer periphery of the door frame 4. The sub-seal 14 which is formed on the outer side of the main seal 12 includes a protrusion 24 which protrudes from the base portion 10 towards the door opening portion 8, and a tubular part 26 which has a generally triangular cross-section. The tubular part 26 is composed of three walls, an upper wall 28, a lower wall 30 and a vertical wall 32. These three walls of the tubular part 26 define a space 34 having a triangular cross-section. The door weather strip 2 thus arranged is attached to the outer periphery of the door frame 4 such that a lower end of the vertical wall 32 of the tubular part 26 contacts an inside face of the peripheral part 36 of the door frame 4.

One method for improving the appearance of the door opening is to extend the interior lining of the door and/or the body panel into the seal zone. The present disclosed embodiment provides enhanced prevention of sound penetration into the passenger compartment in such a design.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to a first embodiment, an automotive vehicle comprising a body including a flange defining an opening is provided. The opening is shaped to receive a component such as a door, trunk or a tailgate. The component includes a main panel and a lining having a substantially coplanar region facing the flange when the component is in a closed position. An elongated resilient sealing member is secured to the coplanar region of the component. The sealing member includes a base engaging the lining and a tubular body projecting from the base. An arm extends from an edge of the base and overlaps the lining.

According to a second embodiment, a seal element for an automotive vehicle door is provided. The seal comprises an elongated base including an elongated sleeve projecting from a first side of the base. The sleeve is configured to receive a head portion of a mounting element. An elongated resilient tubular body projects from the sleeve and an arm extends from an edge of the base toward a second side. A finger projects from the arm and is juxtaposed to the second side of the base.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
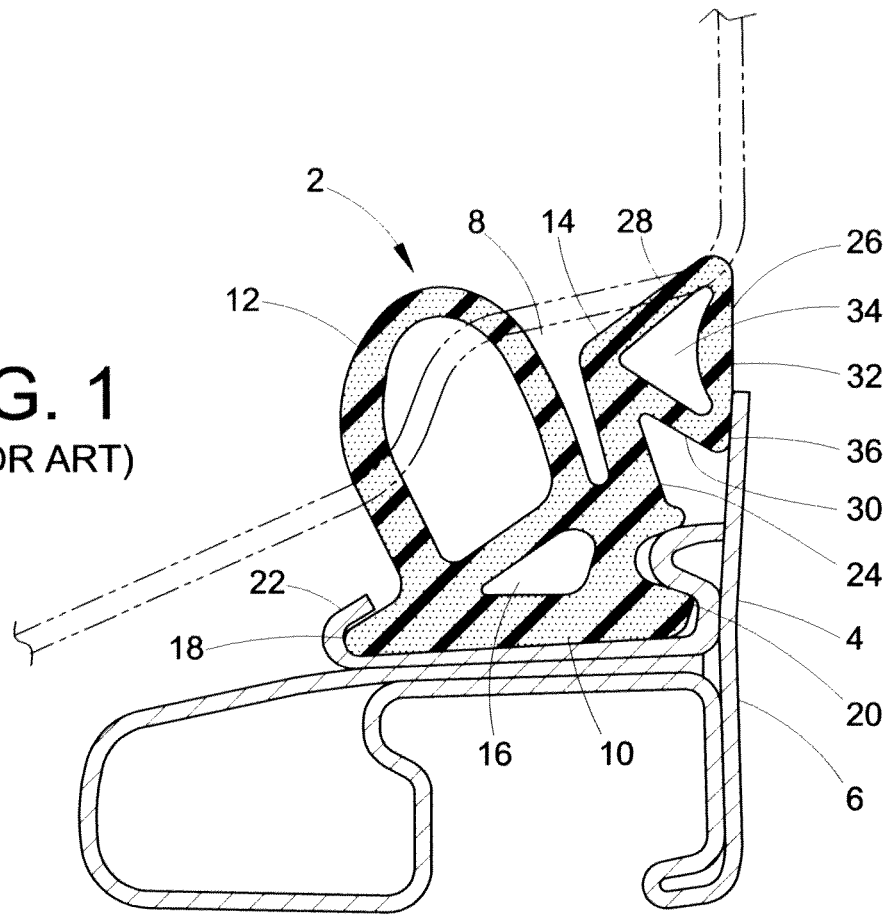
FIG. 1 is a cross-section view of a prior art door sealing arrangement.

One or more embodiments or implementations are hereinafter described in conjunction with the drawings, where like reference numerals are used to refer to like elements throughout, and where the various features are not necessarily drawn to scale.

Figure 2:
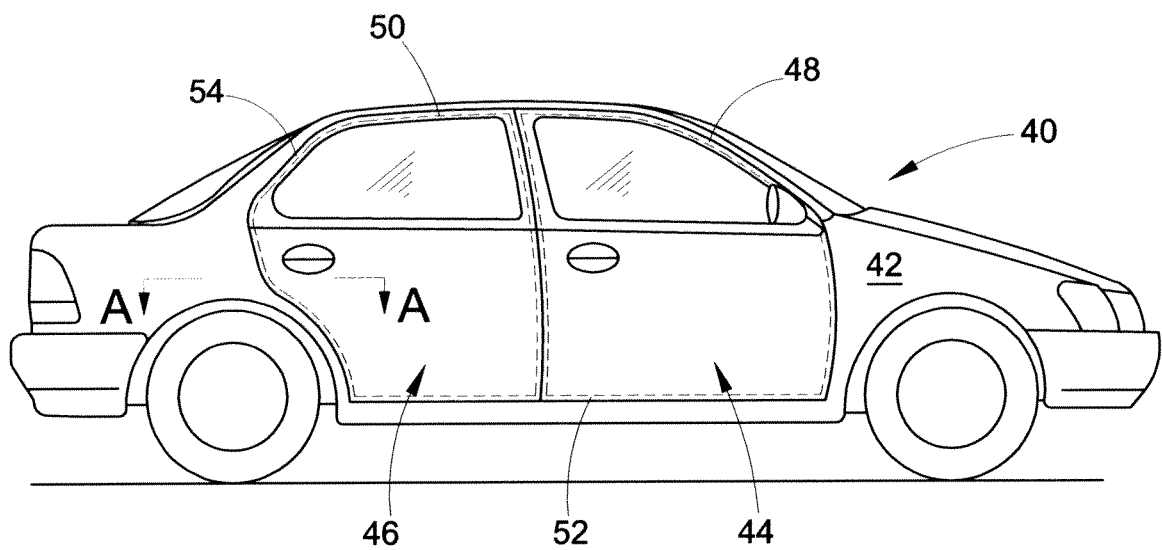
FIG. 2 is a perspective view of an automotive vehicle.

With reference to FIG. 2, a side view of a vehicle 40 is provided. Vehicle 40 includes a side body panel 42, a front door 44 and a rear door 46 which are received within cooperatively shaped openings 48 and 50 in side body panel 42. Doors 44 and 46 are each equipped with a weather seal 52 and 54 respectively.

Figure 3:
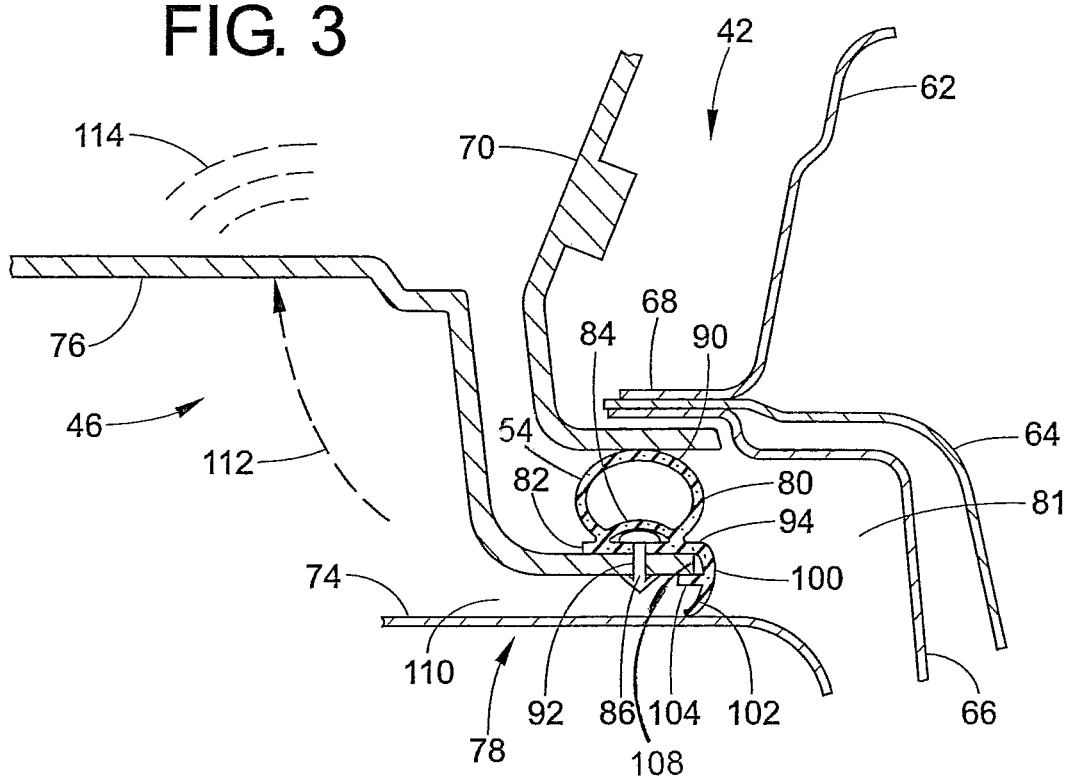
FIG. 3 is a cross-section view taken along line A-A of FIG. 2 of the present disclosed embodiment.
Figure 4:
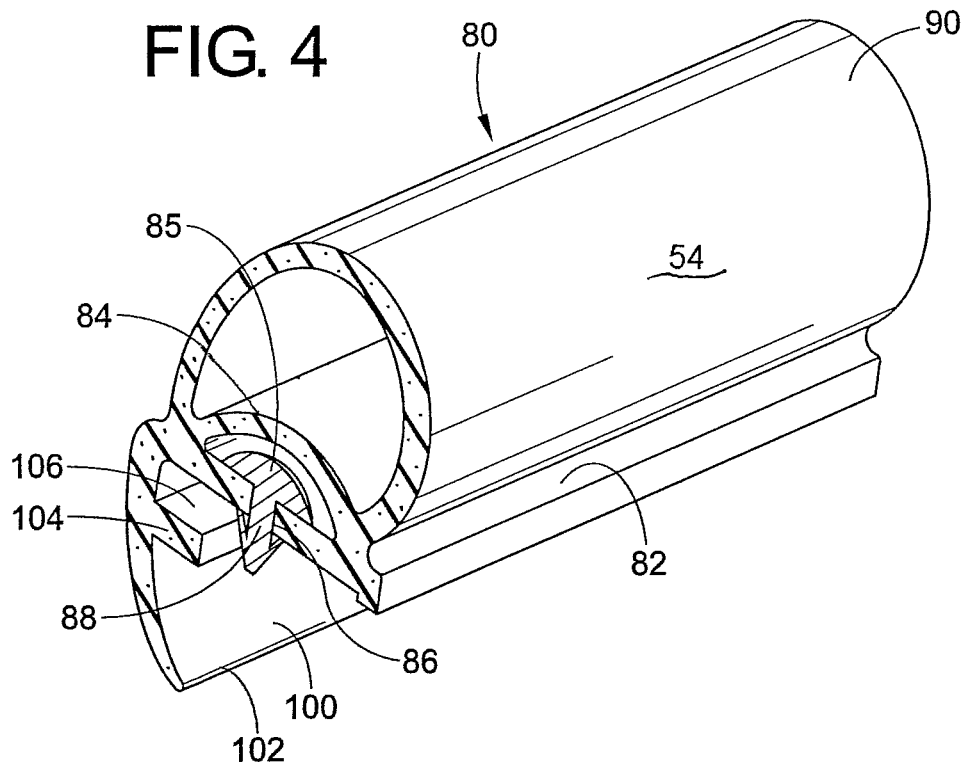
FIG. 4 is a perspective view of the seal element of FIG. 3.

Referring now to FIGS. 3 and 4, the present weather sealing element 80 is depicted. More particularly, side body panel 42 of vehicle 40 is shown comprised of a plurality of individual panels including inner panel 62, center panel 64 and exterior panel 66 joined together to form a flange region 68. The flange can be formed according to any suitable technique practiced in automobile construction. Interior vehicle compartment lining 70 overlaps flange region 68 and extends into the cabin of vehicle 40.

Door 46 is comprised of panel 74 and an interior lining 76. Interior lining 76 and door panel 74 are coplanar in the region 78 adjacent the terminal portion of lining 76. Panels 62, 64, 66 and 74 are commonly formed of metal. Linings 70 and 76 are most commonly formed of a plastic material. Positioned between door 46 and side body panel 42 is sealing member 80. Sealing member 80 provides a seal between door 46 and body panel 42 when door 46 is in a closed position, sealing passage 81.

Although the present embodiment is shown having multiple side body and door panels, this design choice is dictated primarily by vehicle construction choices. As such, it is noted that the sealing arrangement of this disclosure is not limited to the particular door and side body panel construction shown in FIG. 3.

Sealing member 80 includes base 82 and sleeve 84 which receives a head 85 of clip 86. Clip 86 passes through opening 88 in base 82. Clip 86 secures the sealing member 80 to the door by insertion through hole 92 in interior lining 76. It should be recognized that although only a single clip is depicted, multiple clips can be employed to secure sealing member 80 to the door 46. Of course, any means to attach sealing member 80 to door 46 such as screws, bolts, posts, a mating channel, or adhesive can be employed.

Resilient tubular section 90 extends outwardly from sleeve 84. Alternatively, tubular section 90 can extend from base 82. Tubular section 90 is hollow and deformable to facilitate the compression thereof in formation of an acceptable seal.

Extending from an edge 94 of base 82 is arm 100. Arm 100 includes a terminal portion 102 which abuts door panel 74. Arm 100 can be arcuate toward a center-line of the sealing element 80 to encourage an outward bowing of the arm as it is compressed against door panel 74. Extending toward clips 86 is a finger 104 which in combination with arm 100 and base 82 forms a notch 106, sized to accommodate edge 108 of interior lining 76. Notch 106 can be sized to be substantially equivalent in width to the thickness of interior lining 76 such that an interference fit is formed when edge 108 is inserted therein.

In its installed condition, sealing member 80, and more particularly arm 100 seals a gap 110 between interior lining 76 and interior panel 74 which blocks the potential ingress of sound (and water/particulates) into the cabin of the vehicle, as depicted by lines 112. In this manner sound 114 penetration into the cabin is reduced.

To provide suitable strength base, arm and finger elements, 82, 100 and 104 can be comprised of a thermoplastic rubber while tubular section 90 can be comprised of an ethylene propylene diene monomer (M-class) rubber (EPDM) foam synthetic rubber to provide sufficient resiliency.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An automotive vehicle comprising a body including a flange defining an opening, said opening shaped to receive a component selected from one of a door, a trunk and a tailgate, said component having a main panel and a lining having a substantially coplanar region, a gap existing between said main panel and said lining in said substantially coplanar region, said coplanar region overlapping said flange when said component is in a closed position, an elongated sealing member secured to said coplanar region of said component, said sealing member including a base engaging said lining, a resilient tubular body projecting from said base opposite said lining and an arm extending from an edge of said base and overlapping said lining, said arm including a base engaging end and a panel engaging end, said base including a plurality of passages disposed on a longitudinal axis of the elongated sealing member, a finger projecting from said arm intermediate said base engaging end and said panel engaging end, said finger extending into said gap and terminating between said arm and said longitudinal axis.

2. The vehicle of claim 1 wherein said sealing member is secured to said component via one of clips, screws, bolts, posts, mating channel, adhesive and combinations thereof.

3. The vehicle of claim 1 wherein said component is a door.

4. The vehicle of claim 1 wherein said tubular body abuts said flange when the component is in a closed position.

5. The vehicle of claim 4 including a body lining overlapping said flange.

6. The vehicle of claim 1 wherein said finger is generally parallel to said base.

7. The vehicle of claim 6 wherein said base, arm and finger form an elongated notch having a width substantially equivalent to a thickness of said lining.

8. The vehicle of claim 1 wherein said arm is arcuate.

9. The vehicle of claim 8 wherein said base is substantially planar from a first edge to an opposed edge and said tubular body includes a first end projecting from said first edge of the base and a second end projecting from said opposed edge of the base.

10. The vehicle of claim 1 wherein said tubular body is comprised of ethylene propylene diene monomer (M-class) rubber (EPDM) foam synthetic rubber.

11. The vehicle of claim 10 wherein the base of said sealing member is comprised of thermoplastic rubber.

12. The vehicle of claim 1 wherein said base includes an elongated sleeve projecting from a side of said base opposite said lining and disposed within said tubular body, said sleeve configured to receive a head portion of a mounting element.

13. The vehicle of claim 12, wherein said lining is comprised of plastic.

14. The vehicle of claim 12 wherein said mounting element comprises one of a screw, bolt and post secured to said lining.

15. A seal element for an automotive vehicle door comprising an elongated base including an elongated sleeve projecting from a first side of said base, said sleeve configured to receive a head portion of a mounting element, an elongated resilient tubular body projecting from said sleeve and an arm extending from an edge of said base toward a second side of said base, a finger projecting from said arm juxtaposing a second side of the base, wherein said base includes a plurality of passages disposed on a longitudinal axis of said elongated sealing member and wherein said finger terminates between said arm and said longitudinal axis.

16. The seal element of claim 15 wherein said arm is arcuate.

17. The seal element of claim 15 wherein said finger is oriented substantially parallel to said base.

18. The vehicle of claim 15 wherein said sleeve is disposed generally concentrically within said tubular body.

19. The seal element of claim 15 wherein said tubular body is comprised of ethylene propylene diene monomer (M-class) rubber (EPDM) foam synthetic rubber.

20. The seal element of claim 19 wherein said base is comprised of thermoplastic rubber.

* * * * *